United States Patent [19]

Peroni

[11] Patent Number: 4,691,457
[45] Date of Patent: Sep. 8, 1987

[54] EMBLEM MOUNTING ASSEMBLY

[75] Inventor: Peter A. Peroni, Pottstown, Pa.

[73] Assignee: LaFrance Corporation, Philadelphia, Pa.

[21] Appl. No.: 663,718

[22] Filed: Oct. 22, 1984

Related U.S. Application Data

[63] Continuation-in-part of Ser. No. 625,667, Jun. 28, 1984, abandoned.

[51] Int. Cl.⁴ .............................................. G09F 3/08
[52] U.S. Cl. .................................. 40/20 A; 40/1.5; 40/1.6; 40/622
[58] Field of Search ............... 40/1.5, 1.6, 20, 618, 40/620, 622

[56] References Cited

U.S. PATENT DOCUMENTS

| | | | |
|---|---|---|---|
| 1,387,217 | 8/1921 | Watters | 411/116 |
| 1,516,547 | 11/1924 | Powell | 40/20 A |
| 1,616,438 | 2/1927 | Brooks | 40/20 A |
| 2,336,184 | 12/1943 | Mitchel | 40/1.5 |
| 2,397,856 | 4/1946 | Hagerty | 40/1.5 |
| 2,659,169 | 11/1953 | Brennan | 40/1.5 |
| 2,739,400 | 3/1956 | Heiger | D11/95 |
| 2,832,161 | 4/1958 | Murphy | 40/1.5 |
| 3,439,439 | 4/1969 | Stimson | 40/1.5 |
| 4,145,465 | 3/1979 | Sanderson | 428/31 |

Primary Examiner—Gene Mancene
Assistant Examiner—Wenceslao J. Contreras
Attorney, Agent, or Firm—Connolly and Hutz

[57] ABSTRACT

A mounting assembly for mounting an emblem to objects such as a vehicle, a wall or a fence includes an anchor member secured to the emblem. A threaded rod is detachably engaged with the anchor member. Additionally, a hold down bar is mounted over the rod, and a locking member is secured to the remote end of the rod.

16 Claims, 9 Drawing Figures

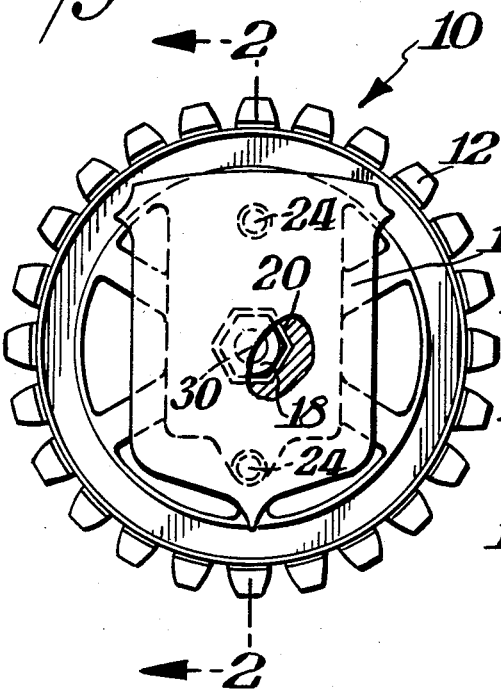
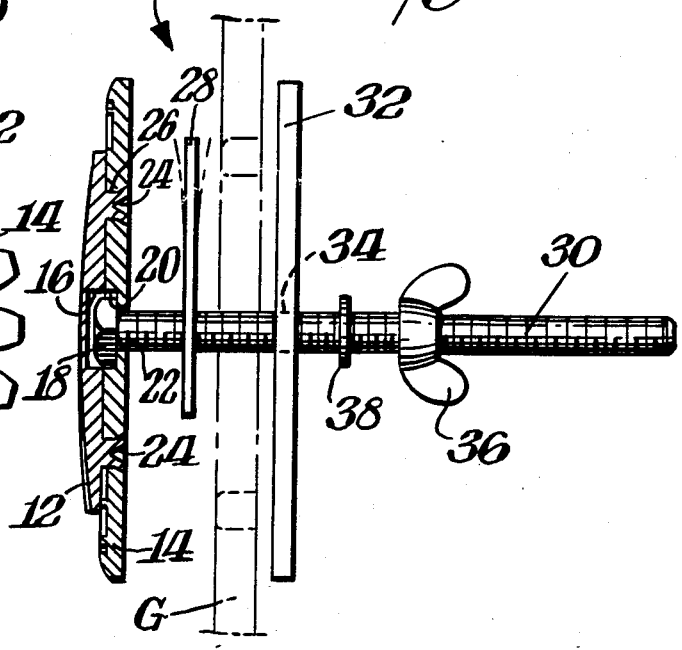
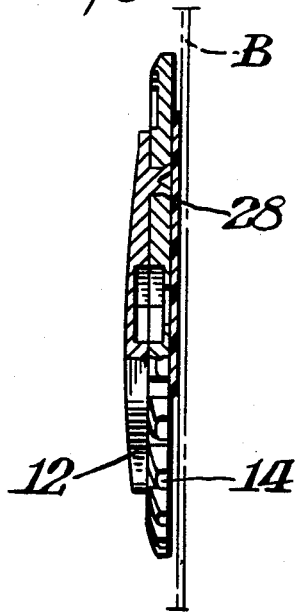
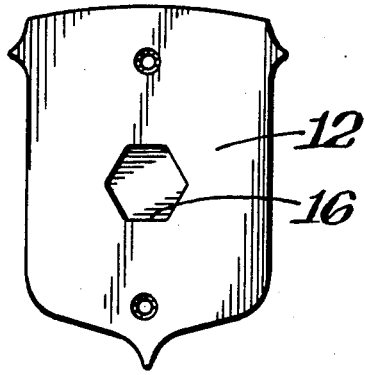
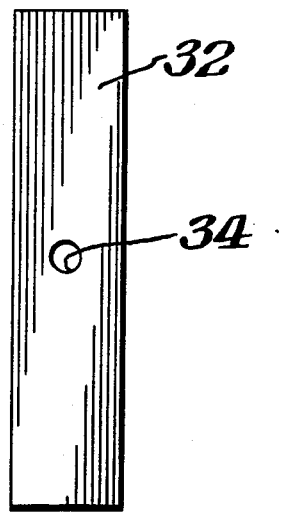

EMBLEM MOUNTING ASSEMBLY

CROSS-REFERENCE TO RELATED APPLICATION

This application is a continuation-in-part of parent application Ser. No. 625,667 filed June 28, 1984, now abandoned.

BACKGROUND OF THE INVENTION

Emblems of various sizes and shapes are frequently used on vehicles such as automobiles. Various means have been attempted to mount the emblem either to the vehicle body or, for example, to the grille. From a manufacturing standpoint, it would be desirable if an assembly could be provided which could be manufactured from low cost parts and adapted to be selectively used with any of a wide variety of different emblems.

Emblems are also mounted to other objects such as walls or fences.

SUMMARY OF THE INVENTION

An object of this invention is to provide a mounting assembly for securing emblems to a vehicle or other object in a quick and convenient manner.

A further object of this invention is to provide such an assembly wherein the same basic structure may be utilized for a variety of different emblems.

A still further object of this invention is to provide such an assembly which is economical to manufacture and easy to assemble without detracting from the effectiveness of the assembly.

In accordance with this invention, the emblem is preferably in the form of two elements such as a shield and hub which are secured together with an anchor member therebetween. In one form of the invention the anchor member is a nut trapped between the shield and hub. A threaded rod may then selectively engage the nut and extend through the grille of a vehicle or through a hole in a wall or fence. In this manner the emblem would be disposed at the outside of the grille and would be locked in place by a hold down bar and locking elements on the rod on the opposite side of the grille.

In a preferred embodiment of this invention, a double side tape is secured to the emblem. The double side tape functions to assist in anchoring the emblem in place when the threaded rod is used as the securing mechanism or alternatively the tape itself may function as the securing means when the emblem is mounted directly to the vehicle body rather than the grille.

In another form of the invention the hub has a hollow boss with a non-circular inner surface which complements an outer surface of the rod to prevent rotation of the rod. In this form the boss functions as the anchor member.

THE DRAWINGS

FIG. 1 is a front elevation view partly broken away of an emblem mounting assembly in accordance with this invention;

FIG. 2 is a cross-sectional view taken through FIG. 1 along the line 2—2;

FIG. 3 is a cross-sectional view in elevation of an alternative mounting arrangement;

FIG. 4 is a rear view in elevation of a shield used as part of the emblem in accordance with the invention;

FIG. 5 is a front elevation view of a hold down bar used in accordance with this invention;

DETAILED DESCRIPTION

Figure 6:
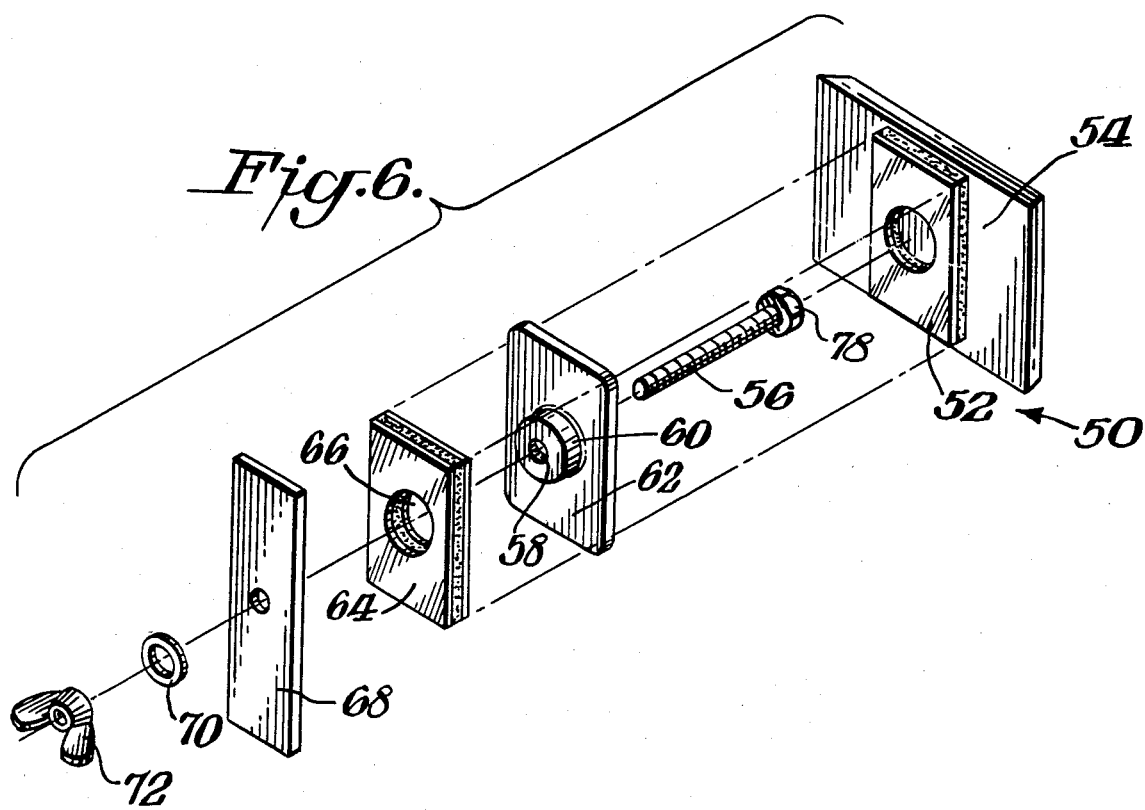
FIG. 6 is a perspective view of an alternative form of the inventive emblem mounting assembly.
Figure 7:
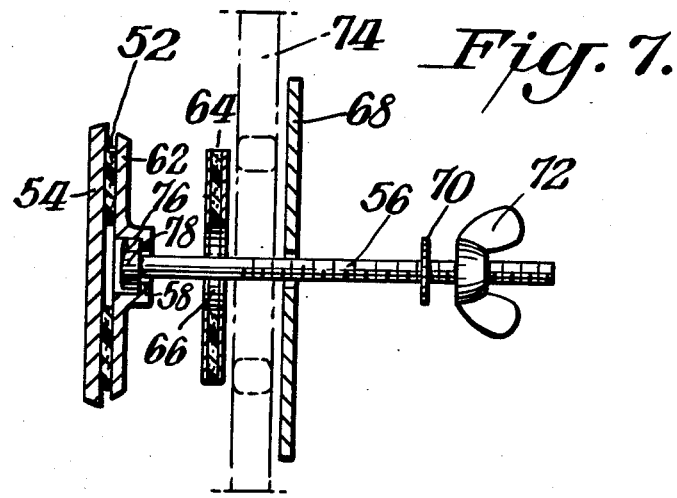
FIG. 7 is a cross-sectional elevation view of the assembly of FIG. 6.

The emblem mounting assembly 10 includes a two element emblem which comprises a shield 12 mounted to a hub 14. The shield and hub would be particularly designed for the desired aesthetic affect. Structurally the rear face of shield 12 would include a recess or pocket 16 of a size and shape to snugly receive an anchoring member, in particular a nut 18. Similarly, the front face of gear hub 14 would have a complementary recess or pocket 20 so that the nut 18 is trapped between the shield 12 and the hub 14. Hub 14 would also have an opening 22 extending completely therethrough whereby the threaded opening in nut 18 is exposed through gear hub 14.

During assembly, nut 18 would be placed in either pocket 16 or pocket 20, and the shield 12 and hub 14 would then be secured together in any suitable manner to thereby form a unit comprising three elements, namely shield 12, hub 14 and nut 18. A particularly advantageous manner of attachment is by providing posts 24 on shield 12 which extend through corresponding openings 26 in hub 14. Thereafter the ends of posts 24 are deformed as by swaging to permanently secure the elements together.

As best illustrated in FIG. 2, a strip of double side tape 28 is also provided from assembly 10. For ease of assembly, tape 28 is of sufficiently large dimension that it includes a hole which may be aligned with the opening 22 in hub 14.

Tape 28 may be applied directly to hub 14. It is preferred, however, that tape 28 be mounted on a threaded rod 30 by sliding the rod 30 through the hole in tape 28. The maximum length of tape 28 outwardly from its hole would be slightly less than the radius or minimum dimension from the center of hub 14. In this manner it is not necessary to locate tape 28 at any particular portion of hub 14 since the alignment of the tape hole with hole 22 in hub 14 will assure that tape 28 will not extend outwardly beyond hub 14.

As best shown in FIG. 2, the next element of assembly 10 is hold down bar 32 (see, for example, FIG. 5). Hold down bar 32 may simply be a metal strip having a hole 34 through which rod 30 may be inserted. The dimensions of hold down bar 32 are sure that the hold down bar will provide a sufficient support member when the assembly is mounted to a vehicle grille.

Assembly 10 further includes a locking member in the form of a wing nut 36. In addition, lock washer 38 is also mounted on threaded rod 30.

In practice, the elements may be assembled in any suitable manner. For example, the shield unit would first be assembled as previously described with the nut 18 exposed through hole 22 of hub 14. A subassembly may then be formed from threaded rod 30 upon which is mounted hold down bar 32, lock washer 38 and wing nut 36. Tape 28 may be applied directly to hub 14 with their holes in alignment or tape 28 may be mounted on rod 30 and then properly located by pressing the end of rod 30 against nut 18 whereby the tape may then slide along rod 30 until it is in contact with and adhesively secured to hub 14. After tape 28 is secured to hub 14, rod 32 may be removed from the shield. Tape 28 then forms a part of the shield unit.

If desired, the shield unit which includes tape 28 may be mounted directly to any desired part of the vehicle body such as the trunk lid or to a wall or fence or other surface by simply utilizing the exposed adhesive side of tape 28. FIG. 3, for example, illustrates such a direct mounting of the emblem unit to the vehicle body B.

The common usage of emblems, however, is to the grille of a vehicle. Assembly 10 is particularly adapted for such usage. In this regard, the emblem unit including tape 28 would be mounted in its desired location, and tape 28 itself would provide an initial mounting. Rod 30 would then extend through the grille. This could be done by inserting rod 30 through the grille and then into threaded engagement with nut 18. An alternative would be to remove hold down bar 32 and lock washer 38 and nut 36 from rod 30 and then mounting rod 30 directly to nut 18 so that the rod may extend through the grille G (see FIG. 2) during the initial mounting of the emblem unit to the grille. Thereafter hold down bar 32 and lock washer 38 and nut 36 could be mounted on rod 3, and the assembly 10 would be firmly held in place by tightening nut 36 to press hold down bar 32 against grille G.

As is apparent, assembly 10 provides a wide variety of different manners of mounting an emblem to a vehicle. This is accomplished because of the knock down fashion for the elements of assembly 10. Thus, for example, if desired, tape 28 could be applied directly to shield 12 for mounting to a vehicle body. In such case, care would be taken to either remove posts 24 or to provide sufficient tape thickness or to cover the posts so that no damage results from the mounting. Another variation would be to mount the shield and gear hub assembly directly to the vehicle body as shown in FIG. 3 by use of tape 28. Finally, by use of all the elements, it is possible for different decorative emblems to be incorporated with the basic assembly elements. This provides versatility not only to the manufacturer, but also to the user since the user may vary the emblem mounted to the grille or the like.

FIGS. 6-9 show an alternative form of assembly 50. As illustrated therein a strip 52 of double side tape is secured to shield 54. Next threaded rod or bolt 56 would be inserted through a hole 58 of hub 62 and rod 56 would then be sueezed toward shield 54 with hub 62 being secured to tape 52. Another strip 64 of double side tape is secured to hub 62 with boss 60 extending through the central hole 66. The assembled components would then be temporarily secured to an object 74 (FIG. 7) such as by inserting bolt 56 through a loop in a chain link fence or through a hole in a wall, panel or vehicle grille. Double face tape would be pressed against object 74 to effect the temporary securement.

Next hold down bar 68 would be telescoped over bolt 56, followed by washer 70. Finally nut 72 would be engaged with bolt 56.

Figures 8, 9:
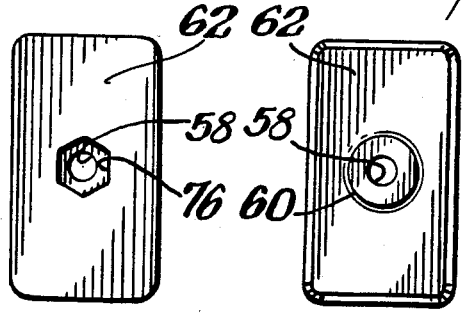
FIGS. 8–9 are front and end elevation views of the hub shown in FIGS. 6–7.

As shown in FIG. 8, hollow boss 62 of hub 60 has a non-circular inner surface 76 to act as an anchoring member. As illustrated the inner surface 76 is hexagonal to complement the hexagonal head 78 of bolt 56 and prevent rotation of bolt 56 much the same as nut 18 anchors rod 30 against rotation. Nut 72 can then be tightened on bolt 56 to draw shield 54 firmly against object 74.

It is to be understood that this invention may be practiced wherever it is desired tomount a decorative emblem such as to a vehicle, fence, wall or panel.

What is claimed is:

1. An emblem mounting assembly comprising an emblem having a front face and a rear face, a rod detachably secured to said emblem through said rear face of said emblem, locking means detachably secured to said rod for mounting said assembly to an object, said emblem including a nut receiving pocket, a nut trapped in said pocket and exposed through said rear face of said emblem, and said rod being threadably secured to said nut, said locking means including a hold down bar mounted on said rod, said emblem includes a shield and a hub unit secured together, and said pocket being formed in juxtaposed faces of said shield and said hub.

2. The assembly of claim 1 including a double side tape having one side secured to said hub.

3. The assembly of claim 2 wherein said double side tape includes a hole aligned with said nut, and said rod extending through said hole of said tape.

4. The assembly of claim 3 wherein said locking means further includes a lock washer and a nut mounted on said rod.

5. An emblem mounting assembly comprising an emblem having a front face and a rear face, a rod detachably secured to said emblem through said rear face of said emblem, locking means detachably secured to said rod for mounting said assembly to an object, an anchor member being secured to said emblem for engagement with said rod to prevent rotation of said rod, said emblem including a shield and a hub unit secured together, said anchor member being part of said hub, and said anchor member being a nut trapped between said shield and hub.

6. An emblem mounting assembly comprising an emblem having a front face and a rear face, a rod detachably secured to said emblem through said rear face of said emblem, locking means detachably secured to said rod for mounting said assembly to an object, an anchor member being secured to said emblem for engagement with said rod to prevent rotation of said rod, said emblem including a shield and a hub unit secured together, said anchor member being part of said hub, said hub including a hollow boss having a non-circular inner surface, said rod having a non-circular head located in said boss, and said boss comprising said anchor member.

7. The assembly of claim 6 wherein said locking means comprises a double face tape and a hold down bar telescoped over said rod, and said locking means further comprises a fastener engaged tos aid rod at its exposed end thereof.

8. A method of mounting a shield to an object comprising forming a nut receiving pocket in juxtaposed faces of a shield and hub, inserting a nut in the pocket, securing the hub and the shield together to trap the nut therebetween and to form an emblem unit wherein the nut is exposed through a hole in the hub, mounting double side tape to the unit, securing the unit to a face of the object by use of the double side tape, threadably enaging the nut with a rod which extends through a hole in the object, and locking the rod in place.

9. The method of claim 8 including mounting a hold down bar on the rod against the object on the side of the object remote from the emblem unit, and manipulating a threaded fastener on the rod to lock the assembly in place.

10. The method of claim 8 wherein the object is a vehicle grille.

11. A method of mounting a shield to an object comprising inserting a rod having a non-circular head through a hollow boss of a hub whereby the head contacts the non-circular inner surface of the boss to prevent the rod from rotating, securing the hub to a shield, inserting the rod through a hole in the object, telescoping a hold down bar over the rod with the object disposed between the shield and the hold down bar, and mounting a fastener to the rod to press the hold down bar against the object.

12. The method of claim 11 including securing adhesive means to the hub and pressing the hub against the object to adhesively secure the hub to the object before the fastener is mounted to the rod.

13. An emblem mounting assembly comprising an emblem having a front face and a rear face, a rod detachably secured to said emblem through said rear face of said emblem, locking means detachably secured to said rod for mounting said assembly to an object, said locking means comprising a pocket secured to said emblem and having a non-circular inner surface and a head having a non-circular outer surface secured to one end of said rod, said head being mounted in said pocket, a hold down bar detachably mounted on said rod whereby said rod may be inserted through a hole in an object with said emblem being on one side of the object and said hold down bar being on the other side of the object, and a fastener detachably secured to said rod with said hold down bar being between said emblem and said fastener.

14. The assembly of claim 13 wherein said rod is threaded, and said fastener is a nut.

15. The assembly of claim 13 wherein said emblem includes a shield and a hub unit, and said pocket being the inner surface of said hub.

16. The assembly of claim 15 including a double side tape having one side secured to said hub.

* * * * *